May 22, 1962   S. J. WILLARD   3,035,538
PROPELLER GUARDS
Filed April 14, 1961
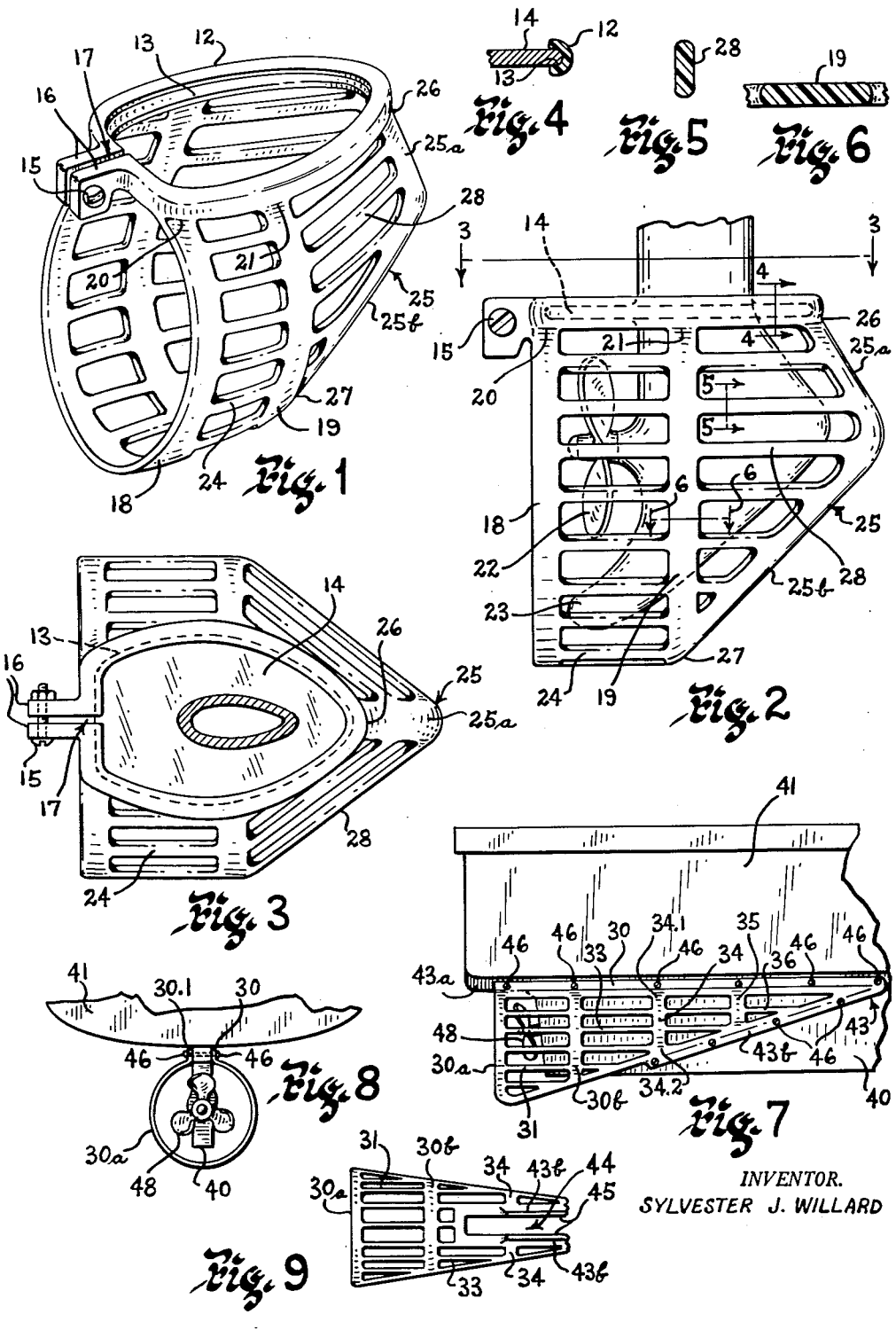
INVENTOR.
SYLVESTER J. WILLARD

United States Patent Office 3,035,538
Patented May 22, 1962

3,035,538
PROPELLER GUARDS
Sylvester J. Willard, Main St., West Warren, Mass.
Filed Apr. 14, 1961, Ser. No. 103,073
6 Claims. (Cl. 115—42)

This invention relates to improvements in propeller guards for use with boats equipped with either inboard or outboard motors.

While several different devices have been made in the past for use as guards for preventing the propeller of boats from becoming entangled with weeds or lines of other fishermen when trolling or the like, such prior art devices, as far as is known, were all made of metallic frames comprising several separately connected parts and to which a metallic screen or the like was attached to surrounding the propeller per se.

Most of such prior art devices, while functioning fairly efficiently for their intended use, embodied protruding parts and rigid sharp edges which, in many instances in the past, when accidentally engaged with the body of swimmers such as skin divers or the like have caused severe injuries and loss of life.

Another disadvantage of prior art devices, due to the fact that they were formed of metal, is that they soon become deteriorated and ineffective, particularly in salt water, and if constructed to function properly for their intended use were bulky, heavy and greatly retarded the driving power of the propellers.

The primary object, therefore, of the prevent invention is to provide a lightweight, durable guard for propellers which will not only function to prevent the entanglement thereof with weeds, fishing lines and the like but will also function to prevent injury to swimmers such as skin divers either from coming in contact with the guard itself or with the rotating propellers.

Another object is to provide a propeller guard of the above nature which is formed of tough, relatively rigid but yieldable non-metallic materials which are resistant to corrosion and deterioration wherein the various parts thereof are in integral relation with each other and have smooth rounded edges and outer surfaces so arranged as to have no sharp protruding parts which might injure a swimmer or other individuals when accidentally engaged therewith.

Another object is to provide an inexpensive unitary device of the above nature and method of making the same which may be easily and inexpensively fabricated and which may be quickly and easily attached to its supporting parts in surrounding relation with the propeller and which will offer a minimum of resistance to the driving force of the propeller.

Other objects and advantages of the invention will become apparent from the following description when taken in conjunction with the accompanying drawings wherein:

FIG. 1 is a perspective view of a propeller guard formed in accordance with the present invention and which is adapted for use particularly with outboard motors;

FIG. 2 is a side elevational view of the guard of FIG. 1 showing it in assembled relation with an outboard motor;

FIG. 3 is a sectional view taken as on line 3—3 of FIG. 2 looking in the direction indicated by the arrows;

FIG. 4 is a fragmentary sectional view taken as on line 4—4 of FIG. 2 and looking in the direction indicated by the arrows;

FIG. 5 is an enlarged fragmentary sectional view taken as on line 5—5 of FIG. 2 and looking in the direction indicated by the arrows;

FIG. 6 is an enlarged fragmentary sectional view taken as on line 6—6 of FIG. 2 and looking in the direction indicated by the arrows;

FIG. 7 is a side elevational view of a modified form of guard shown in position of use on a boat of the type having an inboard motor;

FIG. 8 is a fragmentary slightly reduced rear view of the guard illustrated in FIG. 7; and FIG. 9 is a fragmentary bottom plan view of the guard of FIG. 7.

Referring more particularly to the drawings, the guard shown in FIGS. 1 through 6, which is for use with outboard type motors, comprises a unitary basketlike structure having a main supporting rim 12 provided with inner channeled portion 13 shaped to receive and to be fitted and secured about the peripheral edge of the conventional exhaust flange or the like 14 of standard type outboard motors. As shown in FIG. 3, the channeled rim is adapted to be clampingly secured on the flange by a bolt or the like 15 which extends through aligned openings in angularly disposed integral lip portions 16 formed on the meeting ends of a divided portion 17 of said main supporting rim.

The main supporting rim 12 has a pair of depending spaced hoop-shaped portions 18 and 19 integrally connected therewith as at 20 and 21. The diameters of said hoop-shaped members are so dimensioned as to fit clearly about the propeller 22 and the lower end 23 of the outboard motor. The said hoop-shaped members 18 and 19 are integrally connected by a plurality of spaced substantially parallel horizontally disposed tie members 24 having their outer surfaces substantially flush with the outer surfaces of said hoop-shaped members.

The forward end of the main supporting rim 12 is provided with a brace portion 25 having a forwardly and downwardly curving portion 25a which blends into a rearwardly and downwardly angled portion 25b which has its upper and lower ends integrally connected and smoothly blended with the outer surfaces of the main supporting rim 12 and the lower central portion of the hoop 19, as shown at 26 and 27 in FIG. 2. The said portion 25 has spaced horizontally disposed tie members 28 extending rearwardly in diverging relation therewith and which are respectively integrally connected and smoothly blended at the outer surfaces thereof with the forward side of the hoop-shaped portion 19. It is particularly pointed out that all of the parts of the entire integral structure have smooth rounded edges and all have smooth relatively flat outer side surfaces, as illustrated in section in FIGS. 5 and 6. The parts are blended and so disposed relative to each other as to insure that there are no sharp projecting portions.

The entire integral guard, formed as described above, is preferably made by molding, casting or by a so-called conventional lay-up process and may be formed of a plastic selected from a group comprising nylon, which may be injection molded by commercially known techniques to produce the integrally related components of the guard, cellulose acetate, cellulose acetate butyrate, cellulose proportionate, vinyl chloride acetate, etc., wherein the parts may be separately formed and may thereafter be joined in integral blended relation with each other by the use of suitable known solvents for such plastics as ethyl acetate or acetone, butyl acetate, or methyl-ethyl ketone and with or without the use of heat and pressure; polyethylene, which may be formed by heating and pressing said plastic material in suitably shaped dies or molds, and all plastics of the ABS polymer type commercially known as Cycalac, C9 and Kralastic and which may be joined together by a suitable solvent such as methyl-ethyl ketone with or without the use of heat and pressure or any of the other known plastics having similar characteristics may be used.

Certain of the above plastics may be provided, in known manner, with reinforcing means such as Fiberglas or other fillers or fiberlike materials whereby the said plastics may be provided with additional strength.

All of the above described plastics embody characteristics which are tough, yieldable and yet sufficiently rigid and resistant to impact and breakage and splintering, which are stable as to corrosion and deteriorations in water, particularly salt water, or mixtures of water and oil or gasoline, and which may be formed so that all of the components thereof are in integral smooth blended relation with each other as previously specified above.

It is pointed out that such plastics are sufficiently yieldable so as to permit the main supporting rim 12 to be spread outwardly by an amount sufficient to permit the channeled portion 13 to be placed in surrounding fitted and secured relation with the flange 14, as previously mentioned above. The device is attached in position of use by tightening the bolt or the like 15 which extends through perforations in the respective integral parts of the main supporting rim 12 such as the lips 16, as shown best in FIGS. 2 and 3. The device, therefore, is extremely light in weight and may be very quickly and easily assembled and disassembled from the motor.

In FIGS. 7 through 9 there is shown a modified form of guard wherein the parts are all formed of plastics of the types specified above and in the above described manner so as to have smooth rounded edges and smooth outer surfaces so related and blended as to have no sharp protruding portions. In this instance the guard is adapted for use with a boat of the type having an inboard motor and comprising main supporting rim portions 30 and 30.1 having spaced depending hoop-shaped portions 30a and 30b which are divided only at the tops thereof where they are integrally joined to said supporting rim portions 30 and 30.1. The said hoop-shaped portions 30a and 30b are connected by a plurality of spaced horizontally disposed integral tie members 31 and are of substantially the same structure as the hoop-shaped portions 18 and 19 of FIGS. 1 through 3. The main supporting rim portions 30 and 30.1 have integral brace portions 43 curving forwardly and downwardly at 43a and which integrally blend into rearwardly and downwardly angled portions 43b similar to the brace portion 25. The hoop-shaped portion 30b is in turn integrally connected by a plurality of spaced horizontally disposed tie members 33 to spaced semi-circular brace portions 34 which are integrally connected at their upper ends 34.1 to the upper main supporting rim portions 30 and at their lower ends 34.2 to the rearwardly and downwardly angled portions 43b. The semi-circular portions 34 are connected to spaced smaller semi-circular brace portions 35 which are, in turn, integrally connected at their upper ends with the main supporting rim portions 30 and at their lower ends with the rearwardly and downwardly angled portions 43b. The smaller semi-circular portions 35 are integrally connected by horizontally disposed tie members 36 with said angled portions 43b as shown in FIG. 7.

It is particularly pointed out that the basketlike guard resulting from the above structure, similar to the previously described basketlike guard for outboard motors has its sides angled so as to diverge from the front of the guard toward the rear thereof and that all of the exposed surfaces of the parts of the guard are smooth and so flushly related as to have no sharp projecting portions. The portions 43b, as shown in FIG. 9, are so spaced as to form a slot 44 therebetween and which is located slightly forwardly of the hoop-shaped portion 30b and is adapted to straddle the keel 40 of the boat 41. The spaced members 43b are each shaped to provide continuous outwardly disposed integral rim portions 45 throughout the major portion of the lengths thereof. The respective rim portions 30 and rim portions 45 are connected by screws or bolts or the like 46 to the keel 40 by extending them through openings in said keel and in said rims at spaced aligned intervals.

As previously stated above, in the construction of guard shown in FIGS. 1 through 3 all of the components of the modified guard are formed in integral relation with each other so that no sharp protruding portions extend outwardly therefrom. The guard illustrated in FIGS. 7 through 9, like the guard of FIGS. 1 through 3, is adapted to be placed in surrounding relation with the propeller 48 by springing the sides of the hoop-shaped portions 30a and 30b outwardly whereby the device may be placed about the propeller and on the keel by sliding the slotted portion 44 upwardly of the opposed sides of the keel.

The modified device of FIGS. 7 through 9 may be formed in any conventional manner such as injection molding, casting or laying-up processes of known types. The main features of both constructions are that they are formed of stable plastic materials which are light in weight, tough and resistant to breakage yet slightly yieldable if engaged and have all of their components formed in integral relation with each other and with smooth, rounded edges and flat outer surfaces. The components are further so related with each other that no sharp portions extend outwardly beyond the planes of said surfaces and are exceptionally resistant to corrosion and deterioration particularly in salt water. The spaced horizontally disposed tie members and brace portions are so constructed as to offer little resistance to the driving force of the propellers and further protect individuals such as swimmers from coming in contact with the propellers.

From the foregoing description, it will be seen that simple, durable and inexpensive means and methods have been provided for accomplishing all of the objects and advantages of the invention. It, however, is to be understood that the devices shown and described have been given only by way of illustration and are not to be considered in a limiting sense for further changes in the details of construction and methods of making the same may be made without departing from the spirit of the invention as expressed in the accompanying claims.

Having described my invention, I claim:

1. An all-plastic guard for the propeller of motor-driven boats comprising main supporting means embodying relatively long and narrow spaced side portions, integrally related downwardly and substantially vertically disposed circularly shaped brace portions carried by said side portions with one of said brace portions being located adjacent the rearmost end of said side portions, said main supporting means having an integrally related downwardly extending brace portion on the forwardmost side thereof, said circularly shaped brace portions and said forwardmost downwardly extending brace portion being connected with each other by a plurality of intermediate substantially horizontally disposed spaced integrally related tie portions having their respective outer surfaces in smooth flush relation with the outer surfaces of said brace portions with certain of said tie portions being in rearwardly diverging relation with said brace portion on the forwardmost side of said main supporting means, and all of said integrally related portions of said guard having smooth edges and outer surfaces and being so blended and related as to have no sharp protruding portions.

2. An all-plastic guard for the propeller of motor-driven boats comprising main supporting rim means embodying side portions with depending spaced rearwardly and forwardly disposed hooplike portions integrally carried thereby, said hooplike portions having smooth outer surfaces, said rim portions and said hooplike portions having divided ends and being of a plastic material which will permit said main supporting rim portions and said integrally related divided ends of said hooplike portions to be sprung outwardly relative to each other in a sidewise direction by an amount sufficient to permit the said portions to be fitted over and then allowed to spring back and to be attached in position of use in surrounding relation with the propeller, said hooplike portions being connected by a plurality of spaced intermediate tie portions integrally joined at their opposite ends to said hooplike portions, the outer surfaces of said tie portions being smooth and in flush relation with the outer smooth surfaces of said hooplike portions, said side portions of said main supporting rim means having an integrally related forward brace portion on the forward side thereof, said forward brace portion embodying a forwardly and downwardly curved portion continuing into a downwardly and rearwardly angled portion integrally connected at its end to the lower side of said forwardly disposed hooplike portion, said forward brace portion having a smooth outer surface and a plurality of spaced rearwardly diverging integrally joined tie portions intermediate said forward brace portion and said forwardly disposed hooplike portion and having smooth outer surfaces in flush relation with the smooth outer surfaces of said forward brace portion and said forwardly disposed hooplike portion, all of said integrally related portions of said guard being formed of relatively rigid yet yieldable plastic material and having smooth rounded edges and smooth flush outer surfaces so related as to have no sharp protruding portions.

3. An all-plastic guard for the propeller of motor-driven boats comprising main supporting rim means embodying side portions with depending spaced rearwardly and forwardly disposed hooplike portions integrally carried thereby, said hooplike portions having smooth outer surfaces and smooth curved edges, said side portions and said hookplike portions having divided ends and being of a plastic material which will permit said side and said integrally related divided ends of said hooplike portions to be sprung outwardly in a sidewise direction relative to each other by an amount sufficient to permit said portions to be fitted over and thereafter allowed to spring back and be attached in position of use in surrounding relation with the propeller, said hooplike portions being connected to a plurality of vertically spaced horizontally disposed intermediate tie portions integrally joined at their opposite ends to said hooplike portions and having smooth outer side surfaces substantially flush with the smooth outer side surfaces of said hooplike portions, said side portions of said main supporting rim means having an integrally related brace portion on the forward side thereof, said brace portion having a downwardly curved smooth outer surfaced portion blending into a relatively straight downwardly and rearwardly angled smooth outer surfaced portion integrally connected and flushly blended at its end with the lower side of said forwardly disposed hooplike portion, and a plurality of spaced rearwardly diverging integrally related tie portions intermediate said brace portion on the forward side and said forwardly disposed hooplike portion, all of said integrally related portions of said guard being formed of corrosion resistant relatively rigid yet yieldable plastic material having blended smoothly curved edges and smooth outer surfaces and being so related as to have no sharp protruding portions.

4. An all-plastic guard for the propeller of a motor for driving a boat, said motor having a flangelike portion above said propeller comprising main supporting rim means having an inner channel extending throughout the major portion of the length thereof and having depending spaced rearwardly and forwardly disposed hooplike portions integrally carried thereby, said rim portion and said hooplike portions being formed of corrosion resistant relatively rigid yet yieldable plastic material and having divided ends which will permit said main supporting rim means and hooplike portions to be sprung outwardly in a sidewise direction so as to be located with the channeled portion fitted about said flangelike portion of the motor, said divided ends having perforated integral outwardly extending lip portions, means extending through said perforations for attaching the channel portion of the rim means to the flangelike portion with the guard in position of use in surrounding relation with the propeller, said hooplike portions being connected by a plurality of spaced intermediate tie portions integrally joined at their ends to said hooplike portions, said main supporting rim means having an integrally related brace portion on the forward side thereof, said brace portion having a downwardly curving portion and a downwardly and rearwardly angled portion integrally connected at its end to the lower side of said forwardly disposed hooplike portion, and a plurality of spaced rearwardly diverging integrally attached tie portions intermediate said brace portion and said rearwardly disposed hooplike portion, all of said integrally related portions of said guard having smooth edges and substantially flush outer surfaces and being so related as to have no sharp protruding portions.

5. An all-plastic guard for the propeller of motor-driven boats of the type having a keel comprising main supporting rim means formed of a relatively rigid but yieldable plastic material embodying side portions with depending spaced rearwardly and forwardly disposed hooplike portions integrally carried thereby, said hooplike portions having smooth outer surfaces and smooth curved edges, said side portions and said hooplike portions being divided so as to permit said side portions and said hooplike portions to be sprung outwardly in a sidewise direction so as to be located about and attached in position of use in surrounding relation with the propeller, said hooplike portions being connected by a plurality of spaced intermediate tie portions integrally joined at their ends to said hooplike portions and having smooth outer surfaces in substantially flush relation with the smooth outer surfaces of said hooplike portions, said side portions of said main supporting rim means each having an integrally related brace portion on the forward side thereof which has a smooth outer surfaces, said brace portions having a downwardly curving portion blending into downwardly and rearwardly angled portions integrally connected at their ends to the lower side of said forwardly disposed hooplike portion with the outer surfaces thereof substantially flush with the outer surface of said hooplike portion, said rearwardly angled portions having parts thereof spaced to form a slot adapted to straddle the keel and a plurality of spaced rearwardly diverging integrally attached tie portions intermediate said brace portions and said forwardly disposed hooplike portion each having a smooth outer surface flush with outer surfaces of said portions, all of said integrally related portions of said guard having smooth edges and substantially flush outer surfaces so blended and related as to have no sharp protruding portions.

6. A guard for the propeller of an outboard type motor having a housing for supporting said propeller and a flangelike portion on said housing above the propeller, said guard comprising main supporting means formed of plastic material having an inner channel shaped to fit about and receive said flangelike portion in surrounding relation therewith and means carried by said main supporting means for securing said portion having said inner channel to said flangelike portion, said main supporting means embodying side portions, integrally related spaced downwardly disposed open hooplike brace means joined to said side portions with at least one of said hooplike portions being located adjacent the rear thereof, said hooplike brace means having smooth outer surfaces, said main supporting means having brace means with downwardly and inwardly disposed portions integrally joined to the forward side thereof, said latter brace means having a smooth outer surface, said latter brace means and said open hooplike brace means being connected with each other by a plurality of spaced integrally related tie portions with certain of said tie portions being in rearwardly diverging relation with said latter brace means on the forward side of said main supporting means, each of said tie portions having a smooth outer surface in flush relation with said respective brace means, and all of said integrally related means and portions of said guard being formed of corrosion resistant relatively rigid yet yieldable plastic material having smooth edges and smooth flush outer surfaces so blended and related as to have no sharp protruding portions.

References Cited in the file of this patent

UNITED STATES PATENTS

| | | |
|---|---|---|
| 2,362,323 | Stoppel | Nov. 7, 1944 |
| 2,706,960 | Crew | Apr. 26, 1955 |
| 2,723,641 | Taylor | Nov. 15, 1955 |